(12) United States Patent
Nassi et al.

(10) Patent No.: US 11,132,202 B2
(45) Date of Patent: Sep. 28, 2021

(54) CACHE CONTROL CIRCUITRY AND METHODS

(71) Applicant: Arm Limited, Cambridge (GB)

(72) Inventors: Luca Nassi, Antibes (FR); Rémi Marius Teyssier, Le Bar sur loup (FR); Cédric Denis Robert Airaud, Saint Laurent du Var (FR); Albin Pierrick Tonnerre, Nice (FR); Francois Donati, Antibes (FR); Christophe Carbonne, Mouans-Sartoux (FR); Damian Maiorano, Juan-les-Pins (FR)

(73) Assignee: Arm Limited, Cambridge (GB)

( * ) Notice: Subject to any disclaimer, the term of this patent is extended or adjusted under 35 U.S.C. 154(b) by 1 day.

(21) Appl. No.: 16/580,158

(22) Filed: Sep. 24, 2019

(65) Prior Publication Data
US 2020/0117463 A1    Apr. 16, 2020

(30) Foreign Application Priority Data

Oct. 15, 2018    (GB) ..................................... 1816740

(51) Int. Cl.
*G06F 9/38*      (2018.01)
*G06F 12/0811*   (2016.01)
*G06F 9/30*      (2018.01)

(52) U.S. Cl.
CPC ........ *G06F 9/3836* (2013.01); *G06F 9/30101* (2013.01); *G06F 9/384* (2013.01); *G06F 9/3844* (2013.01); *G06F 9/3867* (2013.01)

(58) Field of Classification Search
None
See application file for complete search history.

(56) References Cited

U.S. PATENT DOCUMENTS 5,524,263 A * 6/1996 Griffth ............... G06F 9/3836
                                                712/217
6,397,296 B1 * 5/2002 Werner ............... G06F 9/3814
                                                711/122

(Continued)

FOREIGN PATENT DOCUMENTS

JP         2010-079361         4/2010

OTHER PUBLICATIONS

Yu et al., "LRC: Dependency-Aware Cache Management for Data Analytics Clusters", Mar. 24, 2017, Hong Kong University of Science and Technology (Year: 2017).*

(Continued)

*Primary Examiner* — Hyun Nam
(74) *Attorney, Agent, or Firm* — Nixon & Vanderhye P.C.

(57) ABSTRACT

An apparatus comprises execution circuitry to perform operations on source data values and to generate result data values; issue circuitry comprising one or more issue queues identifying pending operations awaiting performance by the execution circuitry, and selection circuitry to select pending operations to issue to the execution circuitry; data value cache storage comprising first and second cache regions; and cache control circuitry to control the storing to the first cache region of result data values generated by the execution circuitry and the eviction of stored result data values from the first cache region in response to newly generated result data values being stored in the first cache region; the cache control circuitry being configured to store to the second cache region result data values required as source data values for one or more oldest pending operations identified by the one or more issue queues and to inhibit eviction of a given result data value stored in the second cache region until initiation of execution of a pending operation which requires that given result data value as a source data value.

12 Claims, 7 Drawing Sheets

(56) References Cited

U.S. PATENT DOCUMENTS

| | | | |
|---|---|---|---|
| 8,200,949 B1 | 6/2012 | Tarjan et al. | |
| 9,836,407 B2* | 12/2017 | Shah | G06F 12/0871 |
| 10,127,153 B1* | 11/2018 | Vash | G06F 12/084 |
| 2005/0138297 A1 | 6/2005 | Sodani et al. | |
| 2006/0010292 A1 | 1/2006 | DeVale et al. | |
| 2006/0095736 A1* | 5/2006 | Ando | G06F 9/3885 |
| | | | 712/218 |
| 2014/0189191 A1* | 7/2014 | Pardo | G06F 12/0802 |
| | | | 711/3 |
| 2017/0161078 A1* | 6/2017 | Altevogt | G06F 9/3867 |
| 2020/0192674 A1* | 6/2020 | Nassi | G06F 9/3012 |

OTHER PUBLICATIONS

Combined Search and Examination Report for GB1816740.3, dated Mar. 26, 2019, 6 pages.

* cited by examiner

CACHE CONTROL CIRCUITRY AND METHODS

This application claims priority to GB Patent Application No. 1816740.3 filed 15 Oct. 2018, the entire contents which is hereby incorporated by reference.

BACKGROUND

This disclosure relates to cache control circuitry and methods.

In a so-called out of order processor or CPU, instructions are waiting in a structure called an issue queue before being executed in one of available execution units. Instructions are mainly waiting in the issue queue for their source operands to be ready (the data values used to do the computing and produce the instruction result). "Ready" means an operand is produced by a previous instruction and is available for reading on either a direct forwarding path, in the result cache or in a register bank. The fastest operand read is by the forward path (such as for example a path directly from execution output or write-back to the input of an execution unit), followed by a result cache read, and then finally a register bank read.

To become ready, instructions are generally waiting for few operands to be available. Two source operands per instruction are the most common case in at least some architectures.

The result cache is by definition small compared to register bank and is generally very simple in its allocation/eviction policies, especially in the case of a CPU implementing a lot of execution units able to write to the result cache and register bank at the same time. For example, with (say) 10 execution units able to produce results simultaneously, taking "smart" or multi-factorial decisions on which data to evict from the results cache is too complex to be practicable. So, the result cache cannot contain all currently needed operands for a long time and is generally implemented as a simple FIFO (first-in first-out) structure. In other words, the oldest data must be evicted from the result cache back to the register bank to be replaced by youngest data produced by latest executed instructions.

SUMMARY

In an example arrangement there is provided an apparatus comprising:

execution circuitry to perform operations on source data values and to generate result data values;

issue circuitry comprising one or more issue queues identifying pending operations awaiting performance by the execution circuitry, and selection circuitry to select pending operations to issue to the execution circuitry;

data value cache storage comprising first and second cache regions; and cache control circuitry to control the storing to the first cache region of result data values generated by the execution circuitry and the eviction of stored result data values from the first cache region in response to newly generated result data values being stored in the first cache region;

the cache control circuitry being configured to store to the second cache region result data values required as source data values for one or more oldest pending operations identified by the one or more issue queues and to inhibit eviction of a given result data value stored in the second cache region until initiation of execution of a pending operation which requires that given result data value as a source data value.

In another example arrangement there is provided apparatus comprising:

means for executing operations on source data values and to generate result data values;

means for maintaining one or more issue queues identifying pending operations awaiting performance by the execution circuitry;

means for selecting pending operations to issue for execution;

means for controlling the storing to the first cache region of result data values generated by the executing step and the eviction of stored result data values from the first cache region in response to newly generated result data values being stored in the first cache region;

means for storing to the second cache region result data values required as source data values for one or more oldest pending operations identified by the one or more issue queues; and means for inhibiting eviction of a given result data value stored in the second cache region until initiation of execution of a pending operation which requires that given result data value as a source data value.

In another example arrangement there is provided a method comprising:

executing operations on source data values and to generate result data values;

maintaining one or more issue queues identifying pending operations awaiting performance by the execution circuitry;

selecting pending operations to issue for execution;

controlling the storing to the first cache region of result data values generated by the executing step and the eviction of stored result data values from the first cache region in response to newly generated result data values being stored in the first cache region;

storing to the second cache region result data values required as source data values for one or more oldest pending operations identified by the one or more issue queues; and inhibiting eviction of a given result data value stored in the second cache region until initiation of execution of a pending operation which requires that given result data value as a source data value.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
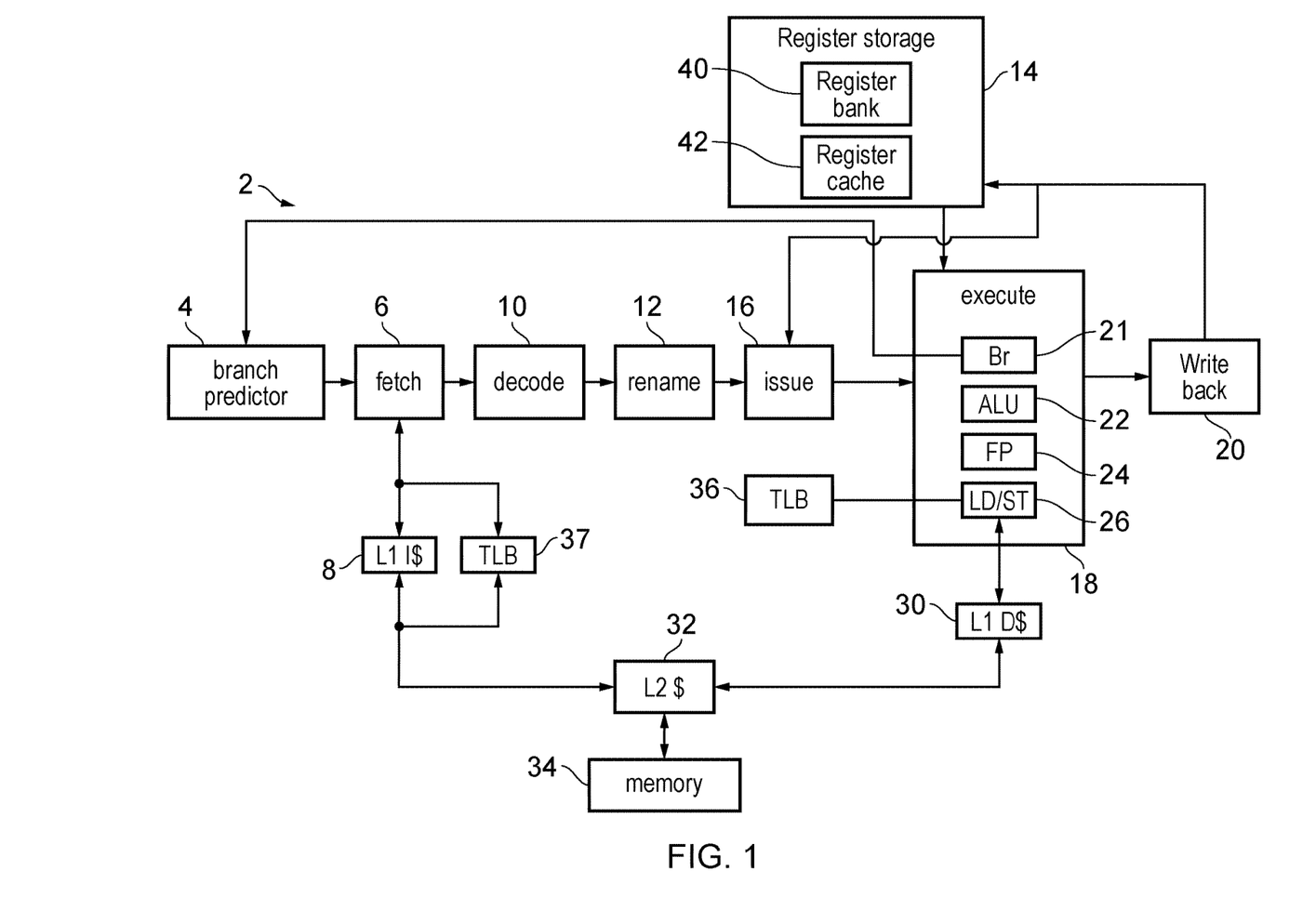
FIG. 1 schematically illustrates an apparatus.

Referring now to the drawings, FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of instructions to be fetched. A fetch stage 6 fetches the instructions identified by the fetch addresses from an instruction cache 8. A decode stage 10 decodes the fetched instructions to generate control information for controlling the subsequent stages of the pipeline. In particular the decoding of an instruction may identify one or more operations to be performed by the execute stage in order to implement execution of the instruction (such operations may also be referred to in some implementations as micro-operations or micro-ops).

A rename stage 12 performs register renaming to map architectural register specifiers identified by the instructions to physical register specifiers identifying registers provided in hardware (such as a hardware or physical register file) in a register bank 40 of register storage 14. Register renaming can be useful for supporting out-of-order execution as this can allow hazards between instructions specifying the same architectural register to be eliminated or at least avoided by mapping them to different physical registers in the hardware register file, to increase the likelihood that the instructions can be executed in a different order from their program order in which they were fetched from the cache 8, which in turn can improve performance by allowing a later instruction to execute while an earlier instruction is waiting for an operand to become available. The ability to map architectural registers to different physical registers can also facilitate the rolling back of architectural state in the event of a branch misprediction.

An issue stage 16 queues operations determined by the decoded instructions until the required source operands for processing those operations are available (for example by being stored in the register bank 40). There may be more than one issue queue. Once the source operands are available for an operation, that operation may be issued to the execute stage 18, to enable the execute stage to perform the operation in order to execute the corresponding instruction. A write back stage 20 writes results of the executed instructions back to the registers of the register bank 40.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the register bank 40 or store operations to store data from the register bank 40 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. The load/store unit 26 may use a translation lookaside buffer 36 and the fetch unit 6 may use a translation lookaside buffer 37 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

As systems increase in complexity, for example by allowing out-of-order execution of instructions, the size and complexity of the register storage 14 has increased. For example, the number of registers provided within the register storage 14 may increase, and multiple register banks 40 may be provided to support those registers. There has also tended to be an increase in the number of read and write ports provided for the register bank(s).

As the register bank(s) increase in size and complexity, the time taken to access registers can become significant, and potentially place a timing limitation on performance of the processor. With the aim of seeking to alleviate the timing constraint, it is known to provide a register cache 42 within the register storage 14 to cache a subset of the data held within the register bank(s) 40. The processor can then attempt to access the required data in the register cache, and only in the event that the data is not in the register cache will an access to the register bank(s) be required.

Whilst the use of a register cache 42 can assist in improving access times to data stored in registers, those access times can still place a constraint on throughput. For instance, at the time all of the source operands that form an operation are available to provide to the execute stage 18, it may be necessary to obtain the data values forming those source operands from the relevant registers within the register bank 40, or obtain cached copies if they are available within the register cache 42. Typically, the issue queue entries for each operation can provide register identifiers identifying the registers holding the data values to be used as source operands, and those register identifiers can be used to access the appropriate storage within the register storage 14 in order to obtain the data values. However, this process can impact the speed with which the operation can be ready to be performed by the execute stage.

Therefore, one reason why instructions are held, waiting for issue, in the issue queue of an out of order processor is that their respective source operands are not yet available. There can be other reasons, for example a temporary lack of processing resources or physical register space, but a common reason is to wait for the availability of source operands.

However, given that a particular instruction may have a dependency on multiple operands, it is possible that one or more of those source operands is available some time before the last of the operands becomes available. This can be simply as a result of the re-ordering of the instruction execution, but in general it is expected that the source operands may become available at different times, which implies that there will be a last one of the source operands to become available.

In a system using a register cache 42, it is typical for the register cache to be smaller than the register bank 40. In order to operate as a cache, the register cache 42 requires an eviction policy so that newly generated values are provided to the register cache 42 by the write back stage 20 and are held in the register cache 42 until they are evicted, for example as the oldest operand held in the register cache 42, in order to make space for newly provided values received from the write back stage 20.

In the case of an instruction requiring two or more source operands, it is possible under such an arrangement of the register cache 42 that one or more of those source operands are generated in advance of a last one or more of the operands, so that the source operands generated first have already been cached and then evicted from the register cache 42 by the time that the last source operand is generated and available. In such a situation, the usefulness of the register cache 42 is reduced, because a potentially time-consuming fetch from the register bank is needed for the earlier operands. While it might in principle be possible to change the eviction policy or protocol of the register cache 42, this could lead to significant processing overheads in a processor with multiple parallel execution units and/or multiple issue queues.

Example techniques to be discussed below aim to address this potential problem.

Figure 2:
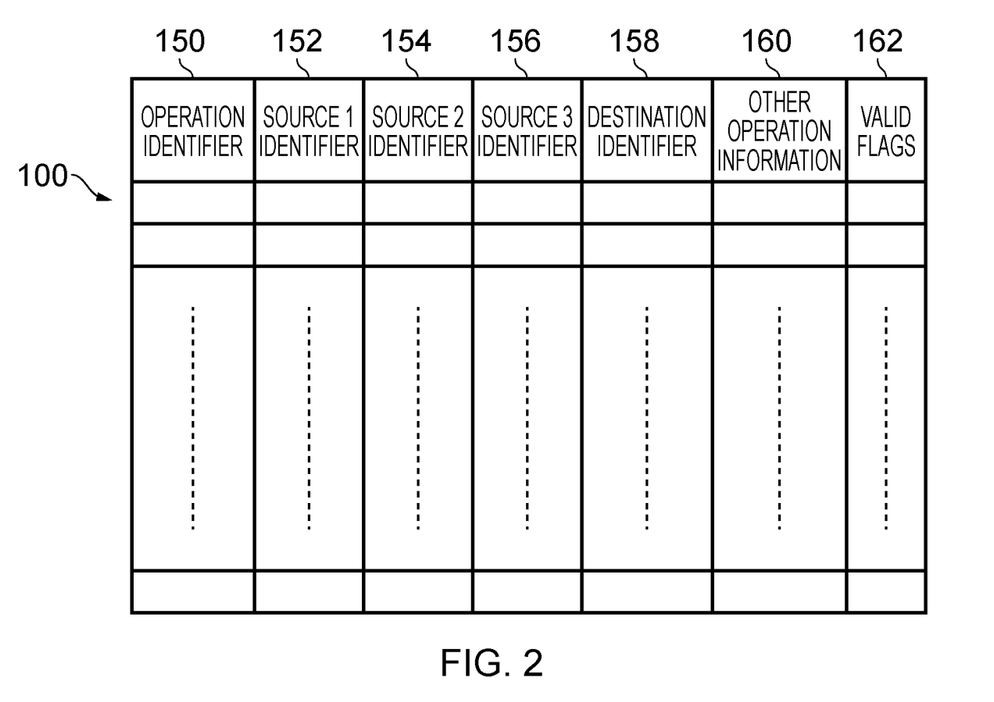
FIGS. 2 and 3 schematically illustrate identifier fields.
Figure 3:
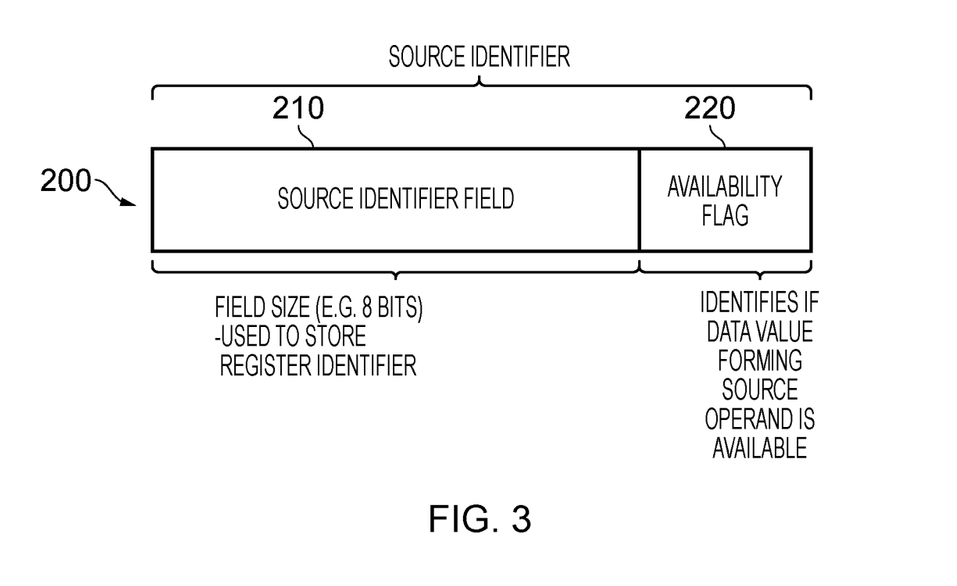

FIG. 2 illustrates in more detail various information that may be provided within each entry of the issue queue. An operation identifier 150 can be used to identify the type of operation that needs to be performed, for example an add operation, a multiply-accumulate operation, or the like. Each entry will also capture information 152, 154, 156 about each of the source operands. In the example of FIG. 3, it is assumed that at most there will be three source operands, but the actual maximum number of source operands may vary dependent on implementation. Whether the maximum number of source operands are used for any particular operation will depend on the type of operation being performed. For example, an add operation may use two source operands, whilst a multiply-accumulate operation may use three source operands (although in one implementation the third source operand in that instance is the current content of a destination register for the result). A set of valid flags 162 can be provided in association with each entry, to identify whether the various pieces of information provided for each entry are valid or not. Hence, for an operation that only uses two source operands, those valid flags may identify that the source identifiers 152 and 154 are valid but the source identifier 156 is not valid.

Each entry also captures information 158 identifying a destination to which the result value is to be written. This will typically take the form of a register identifier identifying a register within the register bank 40 to which the result value is to be written. Other operation information 160 may also be provided within the entry, for example to capture ancillary information, such as the number of clock cycles that will be required to perform the operation once it has been issued to the execute stage 18, an indication of the state of the operation with respect to any speculation being performed, for example whether in the event of a misprediction the operation is not required, or the like.

FIG. 3 schematically illustrates each item of source identifier information 200 (for example the source identifiers 152, 154, 156 shown in FIG. 2). A source identifier field 210 is provided which initially is arranged to store a register identifier identifying a register within the register bank 40 that is to store the data value that will be used as a source operand. That data value may or may not already be stored within that register, since for example that data value may itself be a result value generated by an operation that has not yet completed.

An availability flag 220 is also provided to identify when the data value forming the source operand is available for provision to the execute stage. This can occur for example when the data value is stored within the relevant register of the register bank 40, with the register identifier in the source identifier field identifying that register. As another example, one or more forwarding paths may be used, whereby results output to the writeback stage can be forwarded directly back into the execute stage 18, in parallel with the result data value being written back to the register bank, and if a forwarding path is available for the result, then again the availability flag 220 may be set.

Figure 4:
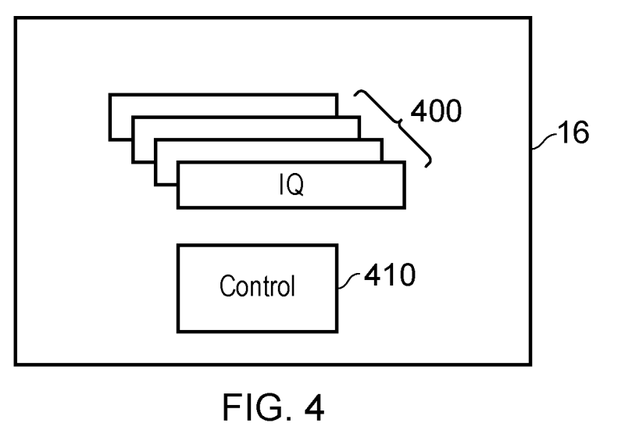
FIG. 4 schematically illustrates issue circuitry.

FIG. 4 schematically illustrates an example of the issue stage 16, comprising multiple issue queues 400 and control circuitry 410.

Each issue queue (IQ) is maintained separately and instructions provided through the pipeline to the issue stage 16 may be added to a particular one of the issue queues 400, for example on a round-robin basis, or on the basis that an issue queue is associated with a particular process or thread or a group of processor threads, or according to the least-populated issue queue at the time that instruction is received.

Again, instructions may be issued from the issue queues on a round-robin basis or according to the availability of source operands for the instructions identified by the issue queues. The control circuitry 410 controls at least the selection of pending operations to issue to the execution stage 18.

Figure 5:
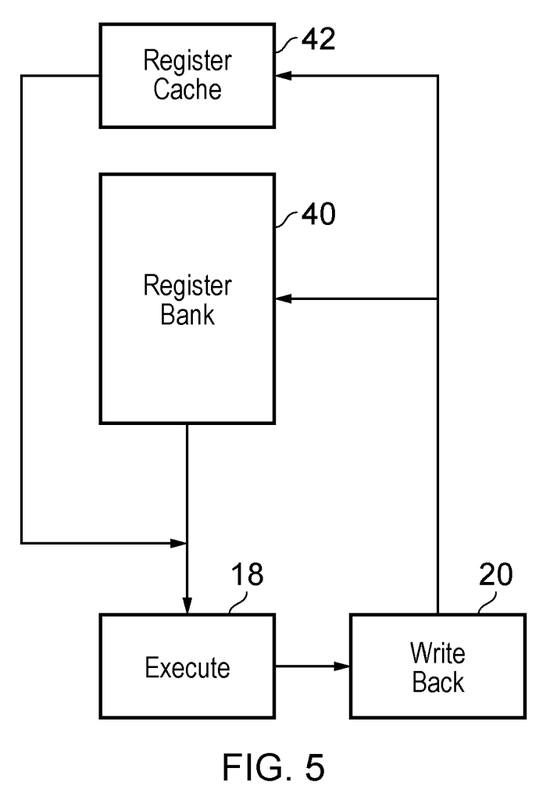
FIGS. 5 to 7 schematically illustrate respective forms of register cache operation.

FIG. 5 schematically represents part of the operation of the apparatus of FIG. 1. A generated data value, which has been generated by the execution stage 18, is written back by the write back stage 20 to both the register bank 40 and to the register cache 42. As mentioned above, it is stored in the register cache 42 until an eviction protocol determines that the written back value is to be evicted from the register cache 42. At execution of an issued instruction, source operands are provided to the execution stage 18 from the register cache 42 if they are held there, or from the register bank 40 if not.

Figure 6:
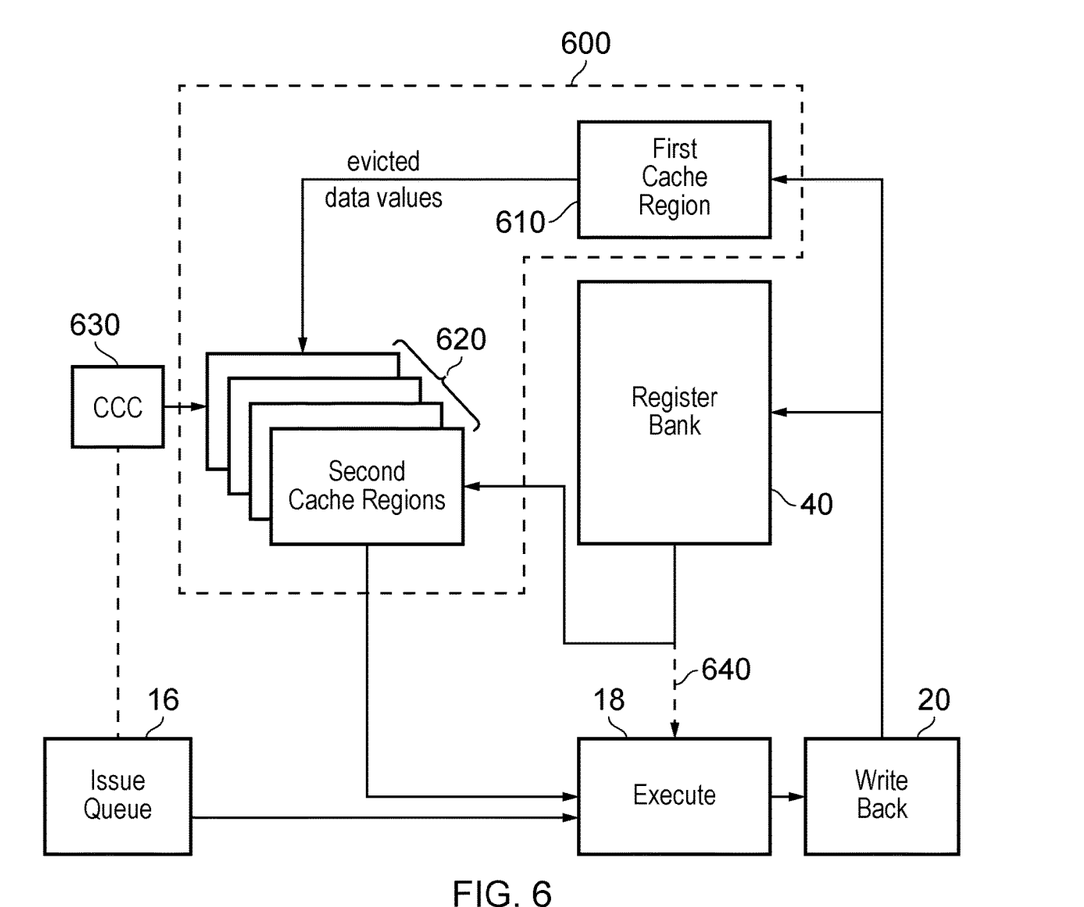
Figure 7:
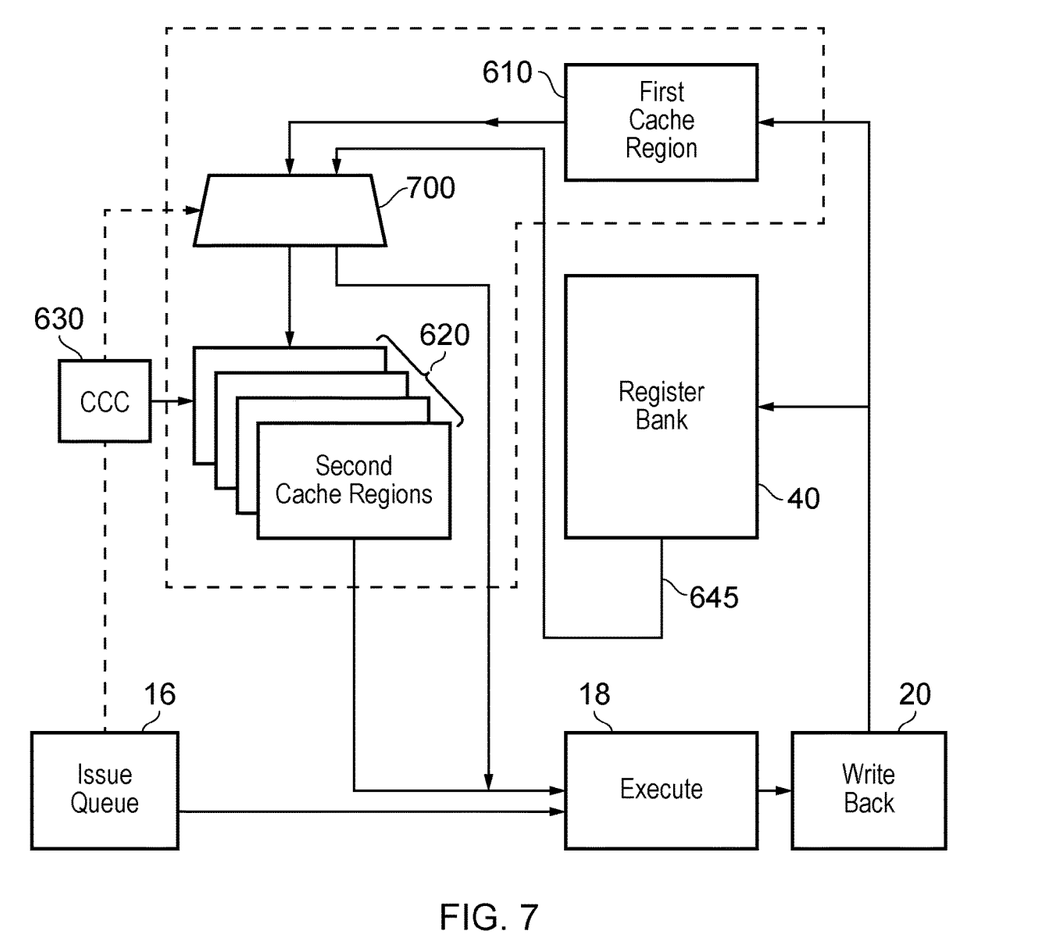

FIGS. 6 and 7 are schematic diagrams illustrating variations of the apparatus of FIG. 1 which aim to alleviate the potential problems discussed above.

Referring first to FIG. 6, as before, execution stage 18 is provided as an example of execution circuitry to perform operations on source data values and to generate result data values which are in turn passed to the write back stage 20 which writes them back (in this example) to the register cache (which will be described in greater detail below) and to the register bank 40.

The issue stage 16 provides one or more issue queues as discussed with reference to FIG. 4, each identifying pending operations awaiting performance by the execution stage 18, and selection circuitry 410 to select pending operations to issue to the execution circuitry.

The register bank 40 acts as a register file comprising a plurality of registers to store the source data values and the result data values.

In contrast to the arrangement of FIG. 5, and in place of the single register cache 42, data value cache storage 600 is provided which comprises first 610 and second 620 cache regions. Cache control circuitry 630 controls the storing to the first cache region 610 of result data values generated by the execution stage 18 (as provided by the write back stage 20). The cache control circuitry 630 also controls the eviction of stored result data values from the first cache region in response to newly generated result data values being stored in the first cache region. In other words, the first cache region 610 acts in a similar manner to the register cache 42 of FIG. 1.

The cache control circuitry 630 is also configured to store to the second cache region 620 result data values required as source data values for one or more oldest pending operations identified by the one or more issue queues and to inhibit eviction of a given result data value stored in the second cache region until initiation of execution of a pending operation which requires that given result data value as a source data value.

The second cache region 620 may be a portion of an overall larger cache shared so that storage is shared between the first cache region 610 and the second cache region 620 or may be a separately implemented storage region. The second cache region 620 stores source operands required by one or more oldest pending operations identified by the one or more issue queues. An oldest instruction is one earliest in the program order, which may be identified by its position in the issue queue (for example, if the issue queue retains instructions in program code order) and/or by detecting marker or tag data associated with the instructions in the issue queue indicating their relative order. By storing operands required by one or more oldest pending operations, the potential difficulty discussed above can be alleviated. An instruction in an issue queue becomes an oldest pending instruction because (for example) it has had to wait in the queue for a long time while one or more of its source operands has been made available. In this period of time, however, it is possible that an earlier-generated source operand needed by that instruction would have been generated, cached and evicted from the first cache region. So, a second cache region is provided with a different eviction protocol, and which can be arranged to store (for example) the earlier-generated source operand(s) for that instruction. For the second cache region, once a data value has been stored, eviction of the stored data value is inhibited (or in some examples, prevented) until the instruction which requires that stored data value as a source operand has been issued for execution, or at least has had its execution initiated. For example, the data value may be retained without eviction until it is output for use by an execution unit, and/or until it is so output and actually used in execution. In some examples, the second cache regions 620 may have a relatively small capacity, such as four operands, is able to stall when full (not to accept any further writes) and retains cached operands according to the eviction policy described here.

In some examples, there are two or more issue queues (the particular example shown in FIGS. 4 and 6 has four issue queues) and the data value cache storage 600 comprises two or more second cache regions, so as to provide a respective second cache region associated with each issue queue. So, in the example of FIG. 6, there are four second cache regions, one for each issue queue. Having multiple partitioned cache regions in this manner can avoid or reduce problems relating to arbitration between multiple issue queues as to which issue queue should obtain source operands in the second cache region. It allows each second cache region to be separately managed and to have a separate eviction protocol simply for the use of the corresponding issue queue.

Example techniques by which the second cache region is populated and by which the relevant source operands are provided for execution will be described below with reference to a schematic flow chart in FIG. 8 and a schematic timing diagram in FIG. 9. In brief, however, the second cache regions 620 can be populated (under the control of the cache control circuitry 630) by the first cache region 610, for example by storing evicted or other data values or from the register bank 40.

The first cache region is populated by all newly written-back data values from the write-back stage 20. Such data values are also written to the register bank 40. A single first cache region, shared between the issue queues, can be used.

Data values can be provided to the execution stage 18, for use in execution of an issued instruction, from the second cache region(s) 620 and/or from the register bank 40. However, in some examples, all data values for use by the execution stage 18 are routed via the data value cache storage 600, which means that the path 640 for the register bank to the execution stage 18 is not used. Such arrangements will be described further below.

Data values are stored in the data value cache storage 600 according to associated "tags". This represents a known way of storing and indexing data values in a cache structure, in which the tags allow the identification of the stored data values with respect to other stored data values. In some examples, to indicate to the issue circuitry which data values are held by the second cache region(s) 620, each second cache region is configured to provide tag data to the respective issue queue, the tag data identifying one or more data values held by that second cache region. An example of such tag data can be at least a subset of the data shown in FIG. 3.

The loading of data values into the second cache region(s) can itself be under the control or influence of the relevant issue queue, in that the cache control circuitry 630 can be configured to control the second cache region associated with a given issue queue to store result data values required as source data values for one or more oldest pending operations identified by that given issue queue. This process is referred to as a so-called "refill" process in the discussion below and can involve an issue queue requesting storage, by a second cache region associated with that issue queue, of a given source operand, for example an operand which was earlier-generated but has now been evicted from the first cache region according to the first cache region's eviction protocol. In other words, the issue stage 16 can be configured to initiate a data value loading or "refill" operation, in response to selection of a pending instruction by the selection circuitry, to retrieve from the register file a result data value which is not currently stored by the data value cache storage and which is required as a source data item by the selected pending instruction.

In other examples, the cache control circuitry is configured to store to the second cache region a data value newly evicted from the first cache region when that newly evicted data value is required as a source data value by an oldest pending instruction identified by the issue queue.

Turning now to FIG. 7, a further example arrangement is illustrated schematically. This is similar in many respects to that shown in FIG. 6, and common features will not be described again. A substantive difference is the use of a schematic demultiplexer 700.

In the arrangement of FIG. 6, all source operands for use by the execution circuitry were routed via the respective second cache region 620. In FIG. 7, they are acquired by the same refill process but may be routed either directly to the execution stage 18 or via the second cache region 620. Therefore, in the case of a data value loading operation initiated in response to selection of an instruction identified by a particular issue queue, the cache control circuitry is configured to perform one or more of: storing the retrieved data value in the second cache region; and providing the retrieved data value to the execution circuitry for use in execution of the selected instruction.

Therefore, as discussed above, there is no direct route 640 (FIG. 6) from the register bank to the execution stage 18. In other words, result data values generated by the execution circuitry are written only to the first cache region and to the register file; and source data values retrieved from the register file are only written (by a path 645) to the second cache region or are provided to the execution circuitry.

In the arrangement of FIG. 7, therefore, all source operands are provided via the data value cache storage including the first and second cache regions as discussed above. The schematic demultiplexer 700, under control of the cache control circuitry 630 is drawn to illustrate that for a particular source operand, the operand can be routed either to the second cache region or directly to the execution stage 18 for execution.

Figure 8:
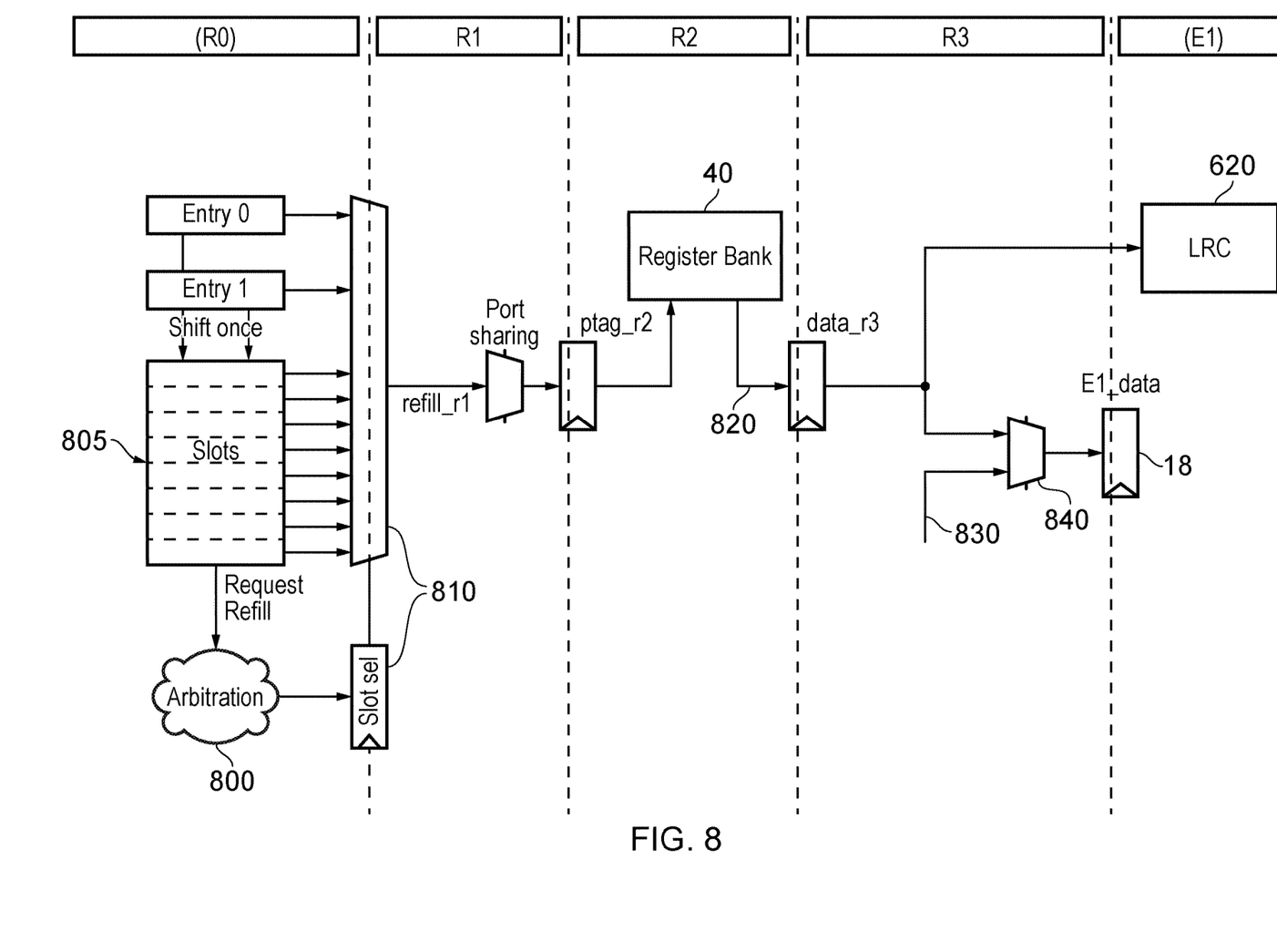
FIG. 8 is a schematic timing diagram.

FIG. 8 is a schematic timing diagram illustrating the example operations discussed above.

The operations shown in FIG. 8 relate to the system obtaining a data value stored in the register bank 40 and which is required in respect of the execution of an instruction to be issued. The timing diagram is divided into five successive clock cycles of the pipeline apparatus of FIG. 1, namely four "refilling" cycles R0 . . . R3 followed by a potential execution cycle E1 (referred to as "potential execution" because the outcome of the refilling operation is, as discussed above, either the supply of the required operand to the execution stage 18 or the storage of the operand in the second cache region 620).

At the first clock cycle illustrated as R0, arbitration circuitry 800 controls selection circuitry 810 to select a particular instruction from a so-called slot 805 in the issue queue to have its source operand(s) obtained using the present techniques. This process may be initiated because the instruction is an oldest instruction in the issue queue (or one of a set of one or more oldest instructions) or may apply to a different instruction. If the instruction is the oldest (or one of the one or more oldest) then the outcome may be that the retrieved operand is stored in the second cache region (to be passed subsequently to the execution circuitry in response to initiation of execution of that instruction) or that the retrieved operand is passed directly to the execution circuitry. For an instruction other than the oldest (or one of the one or more oldest), the operand can be passed to the execution stage 18. If the execution process is not ready for it, the retrieved operand can be discarded and re-obtained later.

In a clock cycle R1 a so-called refill instruction is passed to the register bank 40 which, at a clock cycle R2 provides the required source operand 820.

At the clock cycle R3 the source operand 820 obtained from the register bank 40 is passed via the schematic demultiplexer 700 either to the second cache region 620 appropriate to the corresponding issue queue or to the execution circuitry for execution, along with any other source operands 830 on a forward path routed via a schematic multiplexer 840.

Figure 9:
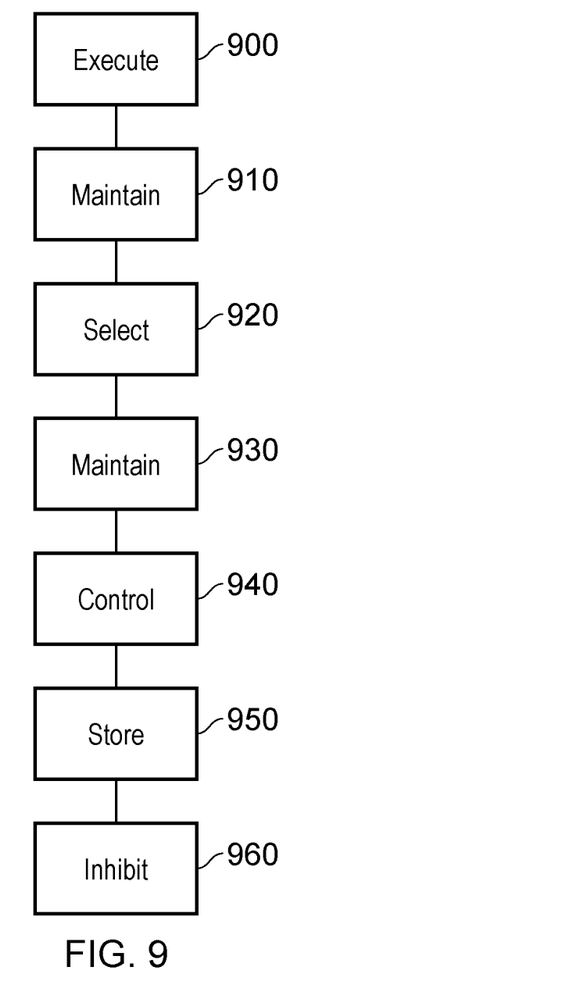
FIG. 9 is a schematic flowchart illustrating a method.

FIG. 9 is a schematic flowchart illustrating a method comprising:

executing (at a step 900) operations on source data values and to generate result data values;

maintaining (at a step 910) one or more issue queues identifying pending operations awaiting performance by the execution circuitry;

selecting (at a step 920) pending operations to issue for execution;

(optionally) maintaining (at a step 930) a register file comprising a plurality of registers to store the source data values and the result data values and data value cache storage comprising first and second cache regions;

controlling (at a step 940) the storing to the first cache region of result data values generated by the executing step and the eviction of stored result data values from the first cache region in response to newly generated result data values being stored in the first cache region;

storing (at a step 950) to the second cache region result data values required as source data values for one or more oldest pending operations identified by the one or more issue queues; and inhibiting (at a step 960) eviction of a given result data value stored in the second cache region until initiation of execution of a pending operation which requires that given result data value as a source data value.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. An apparatus comprising:
   execution circuitry to perform operations on source data values and to generate result data values;
   issue circuitry comprising one or more issue queues identifying pending operations awaiting performance by the execution circuitry, and selection circuitry to select pending operations to issue to the execution circuitry;
   data value cache storage comprising first and second cache regions; and
   cache control circuitry to control storing to the first cache region of result data values generated by the execution circuitry and eviction of stored result data values from the first cache region in response to newly-generated result data values being stored in the first cache region;
   the cache control circuitry being configured to store to the second cache region result data values required as source data values for one or more oldest pending operations identified by the one or more issue queues and to inhibit eviction of a given result data value stored in the second cache region until initiation of execution of a pending operation which requires that given result data value as a source data value.

2. Apparatus according to claim 1, comprising a register file comprising a plurality of registers to store the source data values and the result data values.

3. Apparatus according to claim 1, in which the issue circuitry comprises two or more issue queues.

4. Apparatus according to claim 3, in which the data value cache storage comprises two or more second cache regions, so as to provide a respective second cache region associated with each issue queue of the issue circuitry.

5. Apparatus according to claim 4, in which each second cache region is configured to provide tag data to the respective issue queue, the tag data identifying one or more data values held by that second cache region.

6. Apparatus according to claim 4, in which the cache control circuitry is configured to control the second cache region associated with a given issue queue to store result data values required as source data values for one or more oldest pending operations identified by that given issue queue.

7. Apparatus according to claim 2, in which the issue circuitry is configured to initiate a data value loading operation, in response to selection of a pending instruction by the selection circuitry, to retrieve from the register file a result data value which is not currently stored by the data value cache storage and which is required as a source data item by the selected pending instruction.

8. Apparatus according to claim 7, in which:
in the case of a data value loading operation initiated in response to selection of an instruction identified by that issue queue, the cache control circuitry is configured to perform one or more of:
storing the retrieved data value in the second cache region; and
providing the retrieved data value to the execution circuitry for use in execution of the selected instruction.

9. Apparatus according to claim 1, in which the cache control circuitry is configured to store to the second cache region a data value newly evicted from the first cache region when that newly evicted data value is required as a source data value by an oldest pending instruction identified by the issue queue.

10. Apparatus according to claim 2, in which:
result data values generated by the execution circuitry are written only to the first cache region and to the register file; and
source data values retrieved from the register file are only written to the second cache region or are provided to the execution circuitry.

11. Apparatus comprising:
means for executing operations on source data values and to generate result data values;
means for maintaining one or more issue queues identifying pending operations awaiting performance by the execution circuitry;
means for selecting pending operations to issue for execution;
means for controlling the storageing to the first cache region of result data values generated by the executing step and the eviction of stored result data values from the first cache region in response to newly generated result data values being stored in the first cache region;
means for storing to the second cache region result data values required as source data values for one or more oldest pending operations identified by the one or more issue queues; and
means for inhibiting eviction of a given result data value stored in the second cache region until initiation of execution of a pending operation which requires that given result data value as a source data value.

12. A method comprising:
executing operations on source data values and to generate result data values;
maintaining one or more issue queues identifying pending operations awaiting performance by the execution circuitry;
selecting pending operations to issue for execution;
controlling storage to the first cache region of result data values generated by the executing step and the eviction of stored result data values from the first cache region in response to newly-generated result data values being stored in the first cache region;
storing to the second cache region result data values required as source data values for one or more oldest pending operations identified by the one or more issue queues; and
inhibiting eviction of a given result data value stored in the second cache region until initiation of execution of a pending operation which requires that given result data value as a source data value.

* * * * *